US012650899B2

(12) United States Patent
Luo et al.

(10) Patent No.: US 12,650,899 B2
(45) Date of Patent: Jun. 9, 2026

(54) DATA CHARACTERISTIC-BASED ERROR CORRECTION SYSTEMS AND METHODS

(71) Applicant: Micron Technology, Inc., Boise, ID (US)

(72) Inventors: Fa-Long Luo, San Jose, CA (US); Jaime Cummins, Bainbridge Island, WA (US)

(73) Assignee: Micron Technology, Inc., Boise, ID (US)

( * ) Notice: Subject to any disclaimer, the term of this patent is extended or adjusted under 35 U.S.C. 154(b) by 97 days.

(21) Appl. No.: 18/665,946

(22) Filed: May 16, 2024

(65) Prior Publication Data

US 2024/0385927 A1      Nov. 21, 2024

Related U.S. Application Data

(60) Provisional application No. 63/503,229, filed on May 19, 2023.

(51) Int. Cl.
| | |
|---|---|
| *G06F 11/10* | (2006.01) |
| *G06F 13/16* | (2006.01) |
| *G06N 3/0499* | (2023.01) |
| *G06N 3/06* | (2006.01) |
| *G06N 3/08* | (2023.01) |
| *G06N 3/088* | (2023.01) |

(52) U.S. Cl.
CPC ...... *G06F 11/1068* (2013.01); *G06F 11/1012* (2013.01); *G06F 11/1048* (2013.01); *G06F 13/1668* (2013.01); *G06N 3/0499* (2023.01); *G06N 3/061* (2013.01); *G06N 3/08* (2013.01); *G06N 3/088* (2013.01)

(58) Field of Classification Search
CPC ............. G06F 11/1068; G06F 11/1012; G06F 11/1048; G06F 13/1668; G06N 3/0499; G06N 3/061; G06N 3/08; G06N 3/088
USPC ................ 714/764, 768, 769, 773, 774, 799
See application file for complete search history.

(56) References Cited

U.S. PATENT DOCUMENTS

| | | | | |
|---|---|---|---|---|
| 2007/0230496 A1* | 10/2007 | Guo | ........................ | H04L 1/007 |
| | | | | 370/432 |
| 2010/0211851 A1* | 8/2010 | Dixon | ................... | G06F 11/108 |
| | | | | 714/763 |
| 2016/0132388 A1* | 5/2016 | Kim | ...................... | G11C 29/52 |
| | | | | 714/764 |
| 2018/0159560 A1* | 6/2018 | Sharon | .............. | H03M 13/2906 |
| 2018/0315431 A1* | 11/2018 | Badr | ...................... | G10L 25/84 |
| 2020/0201713 A1* | 6/2020 | Xie | ........................ | G06F 3/0614 |
| 2020/0364118 A1* | 11/2020 | Sun | ........................ | G06N 3/082 |
| 2024/0385927 A1* | 11/2024 | Luo | ........................ | G06N 3/061 |
| 2024/0420742 A1* | 12/2024 | Golov | ...................... | G06N 3/04 |

* cited by examiner

*Primary Examiner* — John J Tabone, Jr.
(74) *Attorney, Agent, or Firm* — Dorsey & Whitney LLP

(57) ABSTRACT

Apparatuses and methods for error correction based on data characteristics are disclosed. Data characteristics can include importance of the data. Data is received at a memory controller from a host device, and a characteristic of the received data is determined. A level of error correction is selected from a plurality of error correction levels for the received data based on the determined characteristic. The received data and an error correction code are written to a memory. The error correction code is generated based on the selected level of error correction. In some implementations, the characteristic of the received data is determined using a neural network.

15 Claims, 5 Drawing Sheets

400

402
Receive a Plurality of Data

404
Receive Characteristics Associated with the Plurality of Data

406
Generate a Training Dataset Using the Plurality of Data and the Characteristics 408
Train a Neural Network Using the Training Dataset to Determine a Data Characteristic of a Particular Data

500

502 — Receive Data at a Memory Controller from a Host Device

504 — Determine a Characteristic of the Received Data

506 — Select a Level of Error Correction for the Received Data based on the Characteristic 508 — Write the Received Data and an Error Correction Code based on the Level of Error Correction to a Memory

DATA CHARACTERISTIC-BASED ERROR CORRECTION SYSTEMS AND METHODS

CROSS REFERENCE TO RELATED APPLICATION(S)

This application claims the benefit under 35 U.S.C. § 119 of the earlier filing date of U.S. Provisional Application Ser. No. 63/503,229 filed May 19, 2023 the entire contents of which are hereby incorporated by reference in their entirety for any purpose.

TECHNICAL FIELD

Embodiments of the disclosure relate generally to memory, and more particularly, in one or more of the illustrated embodiments, to systems and methods for error correction in memory.

BACKGROUND

High data reliability, high speed of memory access, and reduced chip size are features that are demanded from semiconductor memory. Semiconductor memory, such as dynamic random-access memory (DRAM), can use various methods to improve reliability and data integrity by detecting and/or correcting errors in data written to memory. The various conventional methods range from single parity bits to more complex coding algorithms. Often, in a given application, a single method is used for all data, regardless of its relative importance. For more complex coding algorithms, this can lead to increased latency and resource consumption to accommodate necessary increased security and/or reliability of a subset of data. A more nuanced approach to mitigating errors in data is desired.

DETAILED DESCRIPTION

Memory devices may utilize error correction coding (ECC). Generally, ECC techniques may encode original data with additional encoded bits to secure the original bits which are intended to be stored, retrieved, and/or transmitted. However, using ECC may increase the amount of resources (e.g., processing and memory resources) used by a memory, and ECC can increase latency. Accordingly, this application describes technologies that can dynamically adjust error correction, such as based on characteristics of data, to reduce resource consumption as compared with conventional ECC implementations. For example, the methods described herein may include application of different levels of error correction based on relative importance of data.

Various embodiments of the present disclosure will be explained below in detail with reference to the accompanying drawings. The following detailed description refers to the accompanying drawings that show, by way of illustration, specific aspects and embodiments of the disclosure. The detailed description includes sufficient detail to enable those skilled in the art to practice the embodiments of the disclosure. Other embodiments may be utilized, and structural, logical, and electrical changes may be made without departing from the scope of the present disclosure. The various embodiments disclosed herein are not necessarily mutually exclusive, as some disclosed embodiments can be combined with one or more other disclosed embodiments to form new embodiments.

Figure 1:
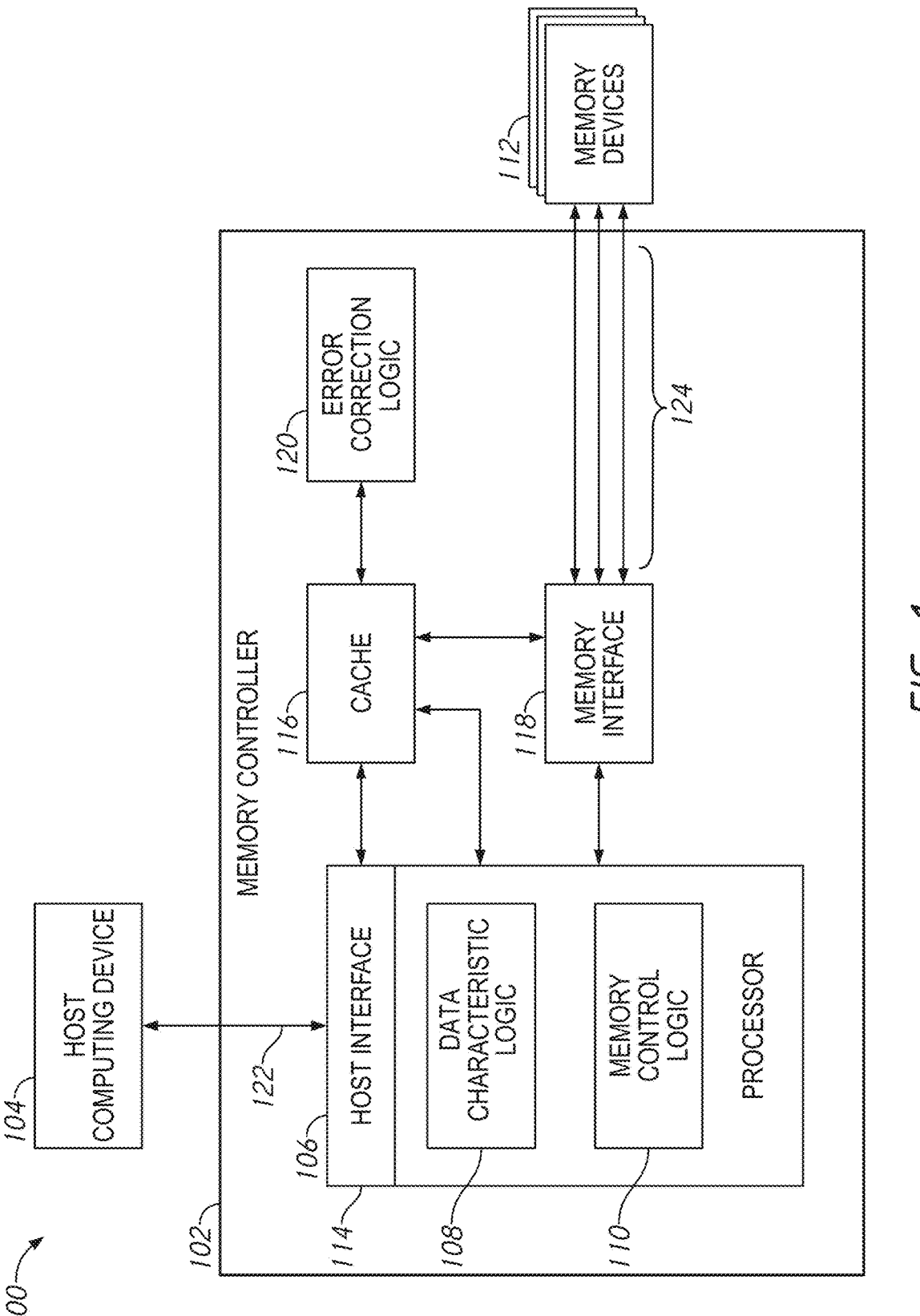
FIG. 1 is a schematic block diagram that illustrates a system for error correction based on data characteristics, in accordance with various embodiments.

FIG. 1 is a schematic block diagram that illustrates a system 100 for error correction based on data characteristics, in accordance with various embodiments. System 100 includes a host computing device 104 coupled to memory controller 102, which may control one or more memory devices 112. In some examples, the memory controller 102 is embodied in or is an element of the host computing device 104. In these and other implementations, the host computing device 104 can comprise a system on chip (SOC), central processing unit (CPU), graphics processing unit (GPU), field-programmable gate array (FPGA), or the like, and the memory controller 102 can comprise logic, circuitry, or a component of such a SOC, CPU, GPU, and/or FPGA. In some examples, the host computing device 104 can be one physical device and the memory controller 102 can be a separate physical device (e.g., each may be chiplets in a system of chiplets). In some cases, memory controller 102 and memory devices 112 can be elements of a module (e.g., a dual-inline memory module (DIMM), card, or drive) and the host computing device 104 can be a separate processor.

Memory controller 102 can include a host interface 114, which may couple to a host bus 122 for connection to the host computing device 104. The host interface 114 is coupled to and/or can be implemented using a processor 106 or processing resource, which can be a SOC, application-specific integrated circuit (ASIC), FPGA, or the like, and can be separate from or an element of host computing device 104 (as described above). The processor 106 can include data characteristic logic 108 and memory control logic 110. The host interface 114 and the processor 106 can also be coupled to the cache 116 via internal memory controller buses, for example. The processor 106 can be coupled to memory devices 112 via memory interface 118 and respective memory buses 124. The memory interface 118 can also be coupled to the cache 116, e.g., also via an internal memory controller bus. The cache 116 can be coupled to an error correction logic 120, which may perform error correction on data communicated to/from the cache 116.

The memory devices 112 can store data retrieved and/or accessed by host computing device 104. As an example, in operation, the host computing device 104 processes datasets (e.g., image or content datasets) for use by one or more neural networks hosted on host computing device 104. A dataset may be stored on the memory devices 112. For example, the processor 106 can obtain, over the host bus 122, the dataset from one or more memory devices 112. The memory devices 112 can be included in and/or can store data for one or more computing devices, such as but not limited to, computing devices in a data center or a personal computing device. The processor 106 may store the dataset (e.g., images) in one or more of the memory devices 112 (e.g., the dataset may be distributed among the memory devices 112). The processor 106 can store discrete units of the dataset (e.g., images or video frames) in the memory devices 112.

The memory devices 112 store and provide information (e.g., data and instructions) responsive to memory access requests received from the memory controller 102, e.g., memory access requests routed or processed by processor 106 from host computing device 104. In operation, the memory devices 112 process memory access requests to store and/or retrieve information based on memory access requests. For example, the host computing device 104 may include a host processor that can execute a user application requesting stored data and/or stored instructions at memory devices 112 (and/or to store data/instructions). When executed, the user application generates a memory access request to access data or instructions in the memory devices 112. Generally, a memory access request can comprise a command and an address, for example, a memory command and a memory address. In various implementations, the memory access request can comprise a command and an address for a read operation, a write operation, an activate operation, or a refresh operation at the memory devices 112. Generally, a received command and address can facilitate the performance of memory access operations at the memory devices 112, such as read operations, write operations, activate operations, and/or refresh operations for the memory devices 112. Accordingly, the memory access request may be or include at least one memory address for one or more of the memory devices 112. In the example of a write operation, the memory access request can also include data, e.g., in addition to the command and the address. In some examples, the memory access request and/or additional data received with the memory access request can also include information about the data, such as relative importance of the data or other data characteristics (e.g., received from the host computing device 104). The memory access requests from the host computing device 104 are provided to the processor 106 via the host bus 122.

Upon receiving one or more memory access requests for the memory devices 112 at the processor 106, the memory controller 102 may perform error correction on data associated with the memory access request to generate error-corrected data, e.g., using error correction logic 120. Additionally or alternatively, the memory controller 102 may perform address translation using the memory access request (e.g., a command and an address) to translate a logical memory address to a physical memory address. For example, the memory address in the memory address request may be a logical address, e.g., as known to the user application executing at the host computing device 104. The memory controller 102 may be configured to translate, using memory control logic 110, that memory address to a physical address of one of the memory devices 112.

Additionally or alternatively, in processing memory access requests at processor 106 of the memory controller 102, the memory controller 102 may perform error correction for data associated with the memory access request using error correction logic 120, e.g., responsive to receiving the command and/or the address. For example, in the context of a write operation, the processor 106 may control error correction of data associated with the memory access request using error correction logic 120, after performing address translation using memory control logic 110. In the context of a read operation, the processor 106 may control error correction data read from the memory devices 112 for the memory access requests at error correction logic 120.

Whether a read or write operation, error correction logic 120 may correct errored data (e.g., perform an error correction operation) associated with that operation. The error correction logic 120 may correct errored data or information obtained from the memory devices 112. For example, error correction logic 120 may correct errored data in accordance with a desired bit error rate (BER) of operation for the memory devices 112. For example, error correction logic 120 may include low-density parity-check correction logic that may correct errored data in accordance with a low-density parity-check (LDPC) code. Accordingly, the error correction logic 120 may include a LDPC encoder. Additionally or alternatively, the error correction logic 120 may include a single parity check (SPC) encoder, and/or an algebraic error correction circuit such as one of the group including a Bose-Chaudhuri-Hocquenghem (BCH) encoder and/or a Reed Solomon ECC encoder, among other types of error correction circuits. In utilizing error correction logic 120, the memory controller 102 can correct errors that may occur to data during memory retrieval from or storage at memory devices 112. A desired BER may be specified by the host computing device 104 or a user executing a user application at the host computing device 104.

The error correction logic 120 may be implemented using discrete components such as an application-specific integrated circuit (ASIC) or other circuitry, or the components may reflect functionality provided by circuitry within the memory controller 102 that does not necessarily have a discrete physical form separate from other portions of the memory controller 102. Although illustrated as a component within the memory controller 102 in FIG. 1, the error correction logic 120 may be external to the memory controller 102 or have one or more components located within the memory controller 102 and one or more components located external to the memory controller 102.

In operation, for errored data to be corrected using error correction logic 120, the cache 116 may provide data (e.g., data obtained from the memory devices 112) to error correction logic 120 to correct that data, and, subsequently, to receive the error-corrected data from error correction logic 120. In some implementations, the cache 116 may be coupled directly to a storage device that is part of host computing device 104, like a static random access memory (SRAM) or DRAM storage device and obtains data directly from that storage device. For example, the memory access request provided to the host interface 114 may include a memory access command that is provided to the cache to access a storage device on the host computing device 104, to obtain the data associated with the memory access request. In various implementations, the cache 116 may be a dynamic memory device, like a DRAM, and may interact with the processor 106. For example, the cache 116 may be a data cache that includes or corresponds to one or more cache levels of L1, L2, L3, L4 (e.g., as a multi-level cache), or any other cache level. In the context of a read operation, the data retrieved from the memory devices 112 may be stored at the cache 116 (e.g., in a buffer or queue) such that the error correction logic 120 corrects the data as part of a read operation in the memory access request.

In some implementations, when receiving the one or more memory access requests for the memory devices 112 at the processor 106, the processor 106 may route or store at least a portion of the one or more memory access requests in a queue or buffer(s) (e.g., request, processing, or data buffers) at the cache 116. Data to be corrected at error correction logic 120 may be stored in a data buffer at the cache 116. Additionally or alternatively, the memory access requests may be stored in a queue or a buffer for processing by the processor 106 and/or portions of processing the memory access requests may be stored in a processing buffer. For example, a processor 106 may identify, based on the memory access request, that the memory address of the memory access request is to be stored in a NAND device. To store the data in the NAND device, the processor 106 may first control a NAND memory device of the memory devices 112 to erase data at the physical address (e.g., the memory address as translated by the memory control logic 110). Accordingly, the processor 106 may store, in a processing buffer, the write operation to be executed, subsequent to processing of the erase operation.

Error correction operations (e.g., generating error correction code or error-corrected data) can increase the use of resources and/or increase latency. For example, the error correction logic 120 can generate error correction code to be stored in memory devices 112 along with data received with a write operation (e.g., from the host computing device 104), but the generation of the error correction code increases latency of the write operation and the storage of the error correction code uses more storage resources of the memory devices 112. Accordingly, the disclosed systems and methods dynamically adjust error correction levels based on characteristics of data. For example, data can be received at the memory controller 102 associated with a write operation from the host computing device 104. Before performing error correction operations (e.g., to generate error correction code by the error correction logic 120), the received data are analyzed by the data characteristic logic 108 to determine one or more characteristics of the data. For example, the data characteristic logic 108 can determine a relative importance of the data. Using the one or more characteristics determined by the data characteristic logic 108, the memory control logic 110 can select a level of error correction to be applied to the data. The level of error correction can be selected from a plurality of error correction levels. For example, a first level of error correction can apply no error correction when data is relatively unimportant (e.g., importance level 1), a second level of error correction can apply normal error correction when data is of ordinary importance (e.g., importance level 2), a third level of error correction can apply extra error correction when data is highly important (e.g., importance level 3). Two importance levels or more than three importance levels may be implemented without departing from the scope of the disclosure. After the level of error correction is selected by the memory control logic 110, the data associated with the write operation can be appropriately directed for further processing and storage. For example, when no error correction is applied, that data can be sent to one or more memory devices 112 without error correction code via the memory interface 118 and one or more memory buses 124. When error correction is applied, the data can be provided to the error correction logic 120 and/or the cache 116 to perform error correction operations. For example, the error correction logic 120 can generate error correction code according to the selected level of error correction, and the error correction code can be stored with the data in one or more memory devices 112. In some implementations, different levels of error correction can correspond to different ones of memory devices 112. For example, a first level of error correction can be performed for data stored in a first one of memory devices, a second level of error correction can be performed in a second one of memory devices, and so forth. Advantageously, the system 100 applies the levels of error correction based on data characteristics, such as relative importance of data. Thus, resources (e.g., processing and/or storage resources) can be conserved for relatively unimportant data, such as by forgoing generation and storage of error correction code, and extra error correction can be applied for more important data (e.g., by generating and storing more ECC bits or storing redundant copies of data) to increase the likelihood that errors in the data can be detected and/or corrected. Table 1 below illustrates examples of data characteristics and corresponding levels of error correction.

| Data Characteristic | Error Correction Level | Description |
|---|---|---|
| Unimportant data (e.g., temporary application data that is unlikely to be accessed) | Level 1 | No error correction is performed for the data - e.g., no error correction code is generated, no redundant data is stored. |
| Normal data | Level 2 | Ordinary error correction is performed - e.g., an ordinary amount of error correction code is generated and stored. |
| Important data (e.g., sensitive data, data critical to software operations, high-value data) | Level 3 | Extra error correction is performed - e.g., extra error correction code is generated and stored, and/or redundant copies of data are stored, and/or data are stored using more reliable memory. |

In operation, responsive to the one or more memory access requests including a read operation, the memory devices 112 provide access to the requested data, such that the read data, as plaintext data, is provided to the host computing device 104 via the host bus 122 from the memory controller 102. The memory interface 118 may provide the data through the memory buses 124 and an internal memory controller bus between the memory interface 118 and the cache 116, e.g., to be stored in the cache 116 for access by error correction logic 120. Accordingly, the cache 116 may obtain the requested data from the memory devices 112 and their respective memory buses 124.

In the examples described herein, the memory devices 112 may be non-volatile memory devices, such as a NAND memory device, or volatile memory devices. Generally, volatile memory may have some improved characteristics over non-volatile memory (e.g., volatile memory may be faster). The memory devices 112 may also include one or more types of memory, including but not limited to: DRAM, SRAM, triple-level cell (TLC) NAND, single-level cell (SLC) NAND, solid-state drive (SSD), or 3D XPoint memory devices. Data stored in or data to be accessed from the memory devices 112 may be communicated via the memory buses 124 from the memory controller 102. For example, the memory buses 124 may be peripheral component interconnect express (PCIe) buses that operate in accordance with a non-volatile memory express (NVMe) protocol.

In example implementations, the processor 106 may include any type of microprocessor, central processing unit (CPU), ASIC, digital signal processor (DSP) implemented as part of a field-programmable gate array (FPGA), a system-on-chip (SoC), or other hardware. For example, the processor 106 may be implemented using discrete components such as an application specific integrated circuit (ASIC) or other circuitry, or the components may reflect functionality provided by circuitry within the memory controller 102 that does not necessarily have a discrete physical form separate from other portions of the memory controller 102. Portions of the processor 106 may be implemented by combinations of discrete components. For example, the memory control logic 110 may be implemented as an ASIC, while the data characteristic logic 108 may be implemented as an FPGA with various stages in a specified configuration. Although illustrated as a component within the memory controller 102 in FIG. 1, the processor 106 may be external to the memory controller 102 or have one or more components located within the memory controller 102 and one or more components located external to the memory controller 102.

In various implementations, memory controller 102 may be an NVMe memory controller, which may be coupled to the host computing device 104 via the host bus 122. The host bus 122 may be implemented as a PCIe bus operating in accordance with an NVMe protocol. The memory buses 124 may be NVMe buses in examples operating in accordance with an NVMe protocol. For example, in such implementations, the memory devices 112 may be implemented using NAND memory devices, which are coupled to the NVMe memory controller 102 via respective PCIe buses operating in accordance with an NVMe protocol. Accordingly, the memory buses 124 may be referred to as NVMe memory buses. In comparison to memory systems which may access NAND memory devices via a single host bus coupled to a host computing device 104, the system 100, advantageously, may increase the rate and amount of processing by the number of NVMe memory buses 124 connected to respective memory devices 124. Accordingly, in embodiments where the processor 106 is a FPGA, the system 100 may be referred to as "accelerating" memory access and storage, as system 100 increases availability of data transfer over the memory buses 124.

Additionally or alternatively, the memory controller 102 may be a non-volatile dual in-line memory module (NVDIMM) memory controller, which is coupled to the host computing device 104 via the host bus 122. The host bus 122 may operate in accordance with an NVDIMM protocol, such as NVDIMM-F, NVDIMM-N, NVDIMM-P, or NVDIMM-X. For example, in such implementations, the memory devices 112 may be NAND memory devices or 3D XPoint memory devices. Accordingly, in such implementations, the memory devices 112 may operate as persistent storage for the cache 116, which may be a volatile memory device and/or operate as persistent storage for any volatile memory on the memory controller 102 or the host computing device 104.

Figure 2:
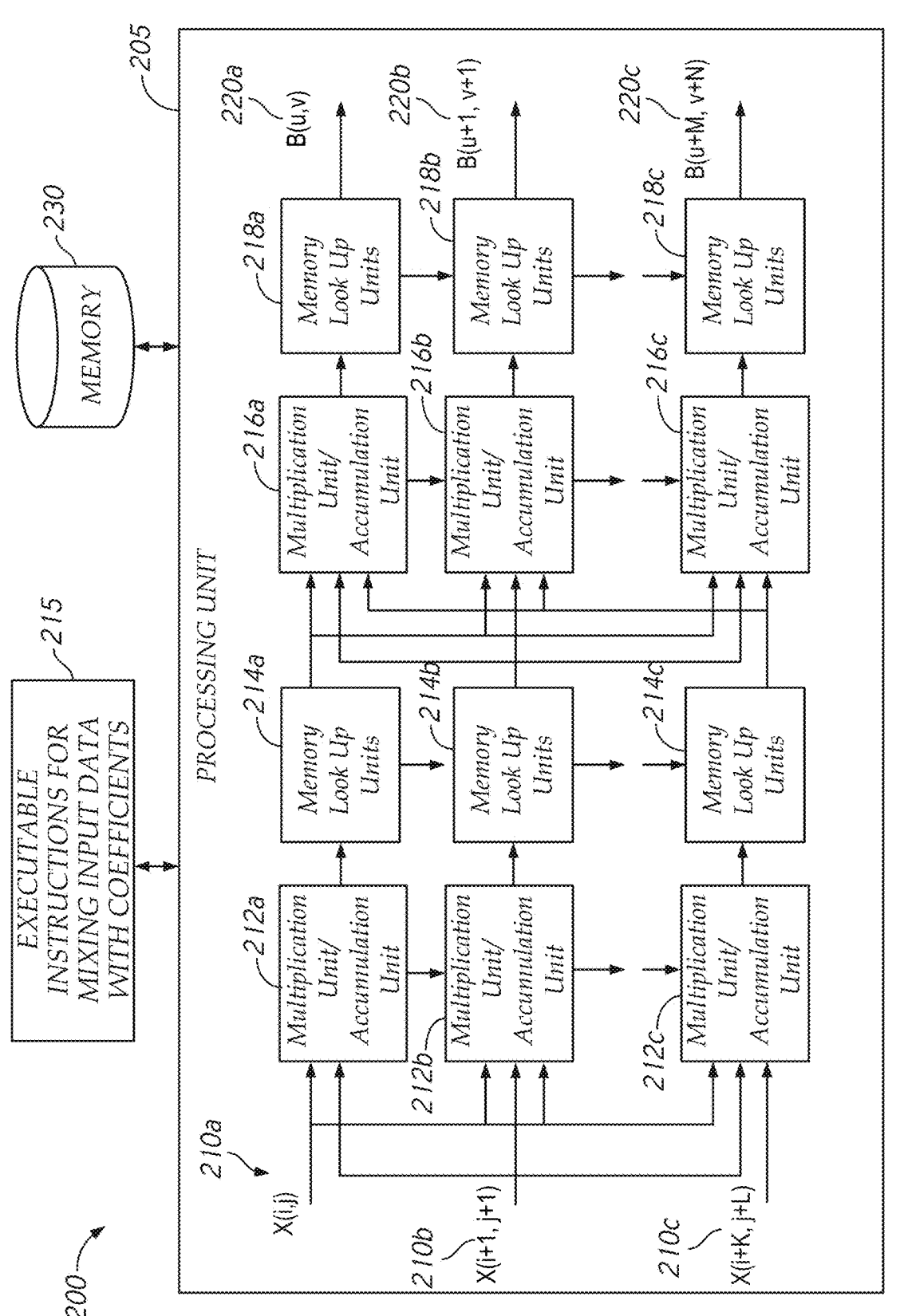
FIG. 2 is a block diagram that illustrates a processing unit arranged in a computing system, in accordance with various embodiments.

FIG. 2 is a block diagram that illustrates a processing unit 205 arranged in a computing system 200, in accordance with various embodiments. The host computing device 104 and/ or the memory controller 102 of FIG. 1 may implement the system 200, in some examples. The processing unit 205 can be configured to implement a neural network (e.g., neural network 350 of FIG. 3), such as a neural network trained to determine a data characteristic and/or select a level of error correction based on a data characteristic.

The processing unit 205 may receive input data (e.g. X (i,j)) 210*a-c* from a computing system, such as a host computing device. In some examples, the input data 210*a-c* may be data for performing a memory access operation, such as a read operation or a write operation. The processing unit 205 may include multiplication unit/accumulation units 212*a-c*, 216*a-c* and memory lookup units 214*a-c*, 218*a-c* that, when mixed with coefficient data retrieved from the memory 230, may generate output data (e.g. B (u,v)) 220*a-c*. In some examples, the output data 220*a-c* may be utilized as input data for another processing stage or as output data, such as one or more data characteristics of the input data

210*a-c*. In other words, the processing unit 205 can comprise one or more stages of a neural network, such that the processing unit 205 receives input data 210*a-c* comprising data for performing memory access operations and generates output data 220*a-c* comprising one or more characteristics of the input data 210*a-c*. In some implementations, the output data 220*a-c* additionally or alternatively includes a level of error correction for the input data 210*a-c*, which can be selected from a plurality of error correction levels.

In implementing one or more processing units 205, a computer-readable medium at an electronic device (e.g., host computing device 104) may execute respective control instructions to perform operations through executable instructions 215 within a processing unit 205. For example, the control instructions provide instructions to the processing unit 205 that, when executed by the electronic device, cause the processing unit 205 to configure the multiplication units 212*a-c* to multiply input data 210*a-c* with coefficient data and accumulation units 216*a-c* to accumulate processing results to generate the output data 220*a-c*.

The multiplication units/accumulation units 212*a-c*, 216*a-c* multiply two operands from the input data 210*a-c* to generate a multiplication processing result that is accumulated by the accumulation unit portion of the multiplication units/accumulation units 212*a-c*, 216*a-c*. The multiplication units/accumulation units 212*a-c*, 216*a-c* add the multiplication processing result to update the processing result stored in the accumulation unit portion, thereby accumulating the multiplication processing result. For example, the multiplication unit/accumulation units 212*a-c*, 216*a-c* may perform a multiply-accumulate operation such that two operands, M and N, are multiplied and then added with P to generate a new version of P that is stored in its respective multiplication unit/accumulation units. The memory look-up units 214*a-c*, 218*a-c* retrieve coefficient data stored in memory 230. For example, the memory look-up unit can be a table look-up that retrieves a specific coefficient. The output of the memory look-up units 214*a-c*, 218*a-c* is provided to the multiplication unit/accumulation units 212*a-c*, 216*a-c* that may be utilized as a multiplication operand in the multiplication unit portion of the multiplication units/accumulation units 212*a-c*, 216*a-c*. Using such a circuitry arrangement, the output data (e.g. B (u,v)) 220*a-c* may be generated from the input data (e.g. X (i,j)) 210*a-c*.

In some examples, coefficient data, for example from memory 230, can be mixed with the input data X (i,j) 210*a-c* to generate the output data B (u,v) 220*a-c*. The relationship of the coefficient data to the output data B (u,v) 220*a-c* based on the input data X (i,j) 210*a-c* may be expressed as:

$$B(u, v) = f\left(\sum_{m,n}^{M,N} a''_{m,n} f\left(\sum_{k,l}^{K,L} a'_{k,l} X(i+k, j+l)\right)\right) \qquad \text{(Equation 1)}$$

Where $a'_{k,l}$, $a''_{m,n}$ are coefficients for the first set of multiplication/accumulation units 212*a-c* and second set of multiplication/accumulation units 216*a-c*, respectively, and where f(•) stands for the mapping relationship performed by the memory look-up units 214*a-c*, 218*a-c*. As described above, the memory look-up units 214*a-c*, 218*a-c* retrieve coefficients to mix with the input data. Accordingly, the output data may be provided by manipulating the input data with multiplication/accumulation units using a set of coefficients stored in the memory associated with a data characteristic and/or a desired level of error correction. The resulting mapped data may be manipulated by additional multiplication/accumulation units using additional sets of coefficients stored in the memory associated with the data characteristic and/or the desired level of error correction. The sets of coefficients multiplied at each stage of the processing unit 205 may represent or provide an estimation of the processing of the input data in specifically-designed hardware (e.g., an FPGA).

Further, it can be shown that the system 200, as represented by Equation 1, may approximate any nonlinear mapping with arbitrarily small error in some examples and the mapping of system 200 is determined by the coefficients $a'_{k,l}$, $a''_{m,n}$. For example, if such coefficient data is specified, any mapping and processing between the input data X (i,j) 210a-c and the output data B (u,v) 220a-c may be accomplished by the system 200. Such a relationship, as derived from the circuitry arrangement depicted in system 200, may be used to train an entity of the computing system 200 to generate coefficient data. For example, using Equation (1), an entity of the computing system 200 may compare input data to the output data to generate the coefficient data.

In the example of system 200, the processing unit 205 mixes the coefficient data with the input data X (i,j) 210a-c utilizing the memory look-up units 214a-c, 218a-c. In some examples, the memory look-up units 214a-c, 218a-c can be referred to as table look-up units. The coefficient data may be associated with a mapping relationship for the input data X (i,j) 210a-c to the output data B (u,v) 220a-c. For example, the coefficient data may represent non-linear mappings of the input data X (i,j) 210a-c to the output data B (u,v) 220a-c. In some examples, the non-linear mappings of the coefficient data may represent a Gaussian function, a piecewise linear function, a sigmoid function, a thin-plate-spline function, a multi-quadratic function, a cubic approximation, an inverse multi-quadratic function, or combinations thereof. In some examples, some or all of the memory look-up units 214a-c, 218a-c may be deactivated. For example, one or more of the memory look-up units 214a-c, 218a-c may operate as a gain unit with the unity gain. In such a case, the instructions (e.g., executable instructions 215) may be executed to facilitate selection of a unity gain processing mode for some or all of the memory look-up units 214a-c, 218a-c.

Each of the multiplication unit/accumulation units 212a-c, 216a-c may include multiple multipliers, multiple accumulation units, or and/or multiple adders. Any one of the multiplication units/accumulation units 212a-c, 216a-c may be implemented using an arithmetic logic unit (ALU). In some examples, any one of the multiplication units/accumulation units 212a-c, 216a-c can include one multiplier and one adder that each perform, respectively, multiple multiplications and multiple additions. The input-output relationship of a multiplication/accumulation unit 212, 216 may be represented as:

$$B_{out} = \sum_{i=1}^{I} C_i * B_{in}(i) \qquad \text{(Equation 2)}$$

where "I" represents a number to perform the multiplications in that unit, $C_i$ the coefficients which may be accessed from a memory, such as memory 230, and $B_{in}(i)$ represents a factor from either the input data X (i,j) 210a-c or an output from multiplication units/accumulation units 212a-c, 216a-c. In an example, the output of a set of multiplication units/accumulation units, $B_{out}$, equals the sum of the coefficient data, $C_i$ multiplied by the output of another set of multiplication unit/accumulation units, $B_{in}(i)$. $B_{in}(i)$ may also be the input data such that the output of a set of multiplication unit/accumulation units, $B_{out}$, equals the sum of coefficient data, $C_i$ multiplied by input data.

Figure 3:
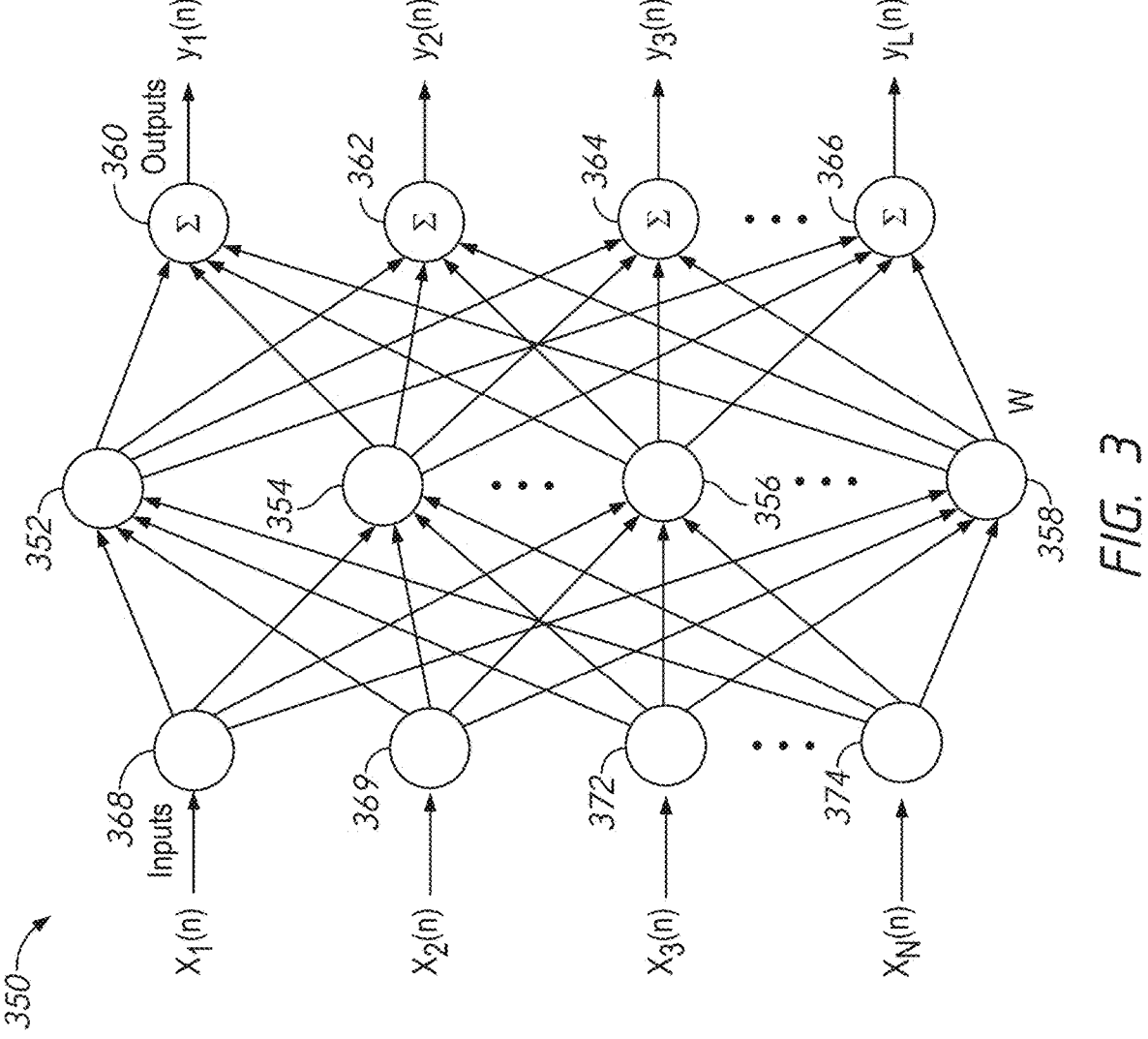
FIG. 3 is a schematic diagram that illustrates a neural network, in accordance with various embodiments.

FIG. 3 is a schematic diagram that illustrates a neural network 350, in accordance with various embodiments. The neural network 350 can be implemented using the host computing device 104 and/or memory controller 102 of FIG. 1 and/or the computing system 200 of FIG. 2, which includes the processing unit 205.

The neural network 350 includes three stages (e.g., layers). While three stages are shown in FIG. 3, any number of stages can be used in other examples. A first stage of neural network 350 includes node 368, node 369, node 372, and node 374. A second stage of neural network 350 includes combiner 352, combiner 354, combiner 356, and combiner 358. A third stage of neural network 350 includes combiner 360, combiner 362, combiner 364, and combiner 366. Additional, fewer, and/or different components may be used in other examples.

Generally, a neural network such as the neural network 350 may be used including multiple stages of nodes. The nodes may be implemented using processing units (e.g., processing unit 205 of FIG. 2) which may execute one or more functions on inputs received from a previous stage and provide the output of the functions to the next stage of the neural network. The processing units may be implemented using, for example, one or more processors, controllers, and/or custom circuitry, such as an application-specific integrated circuit (ASIC) and/or a field-programmable gate array (FPGA). The processing units may be implemented as combiners and/or summers and/or any other structure for performing functions allocated to the processing unit. In some examples, certain of the elements of neural networks described herein perform weighted sums, e.g., may be implemented using one or more multiplication/accumulation units, which may be implemented using processor(s) and/or other circuitry.

In the example of FIG. 3, the neural network 350 may have an input layer, which may be a first stage of the neural network including node 368, node 369, node 372, and node 374. The nodes node 368, node 369, node 372, and node 374 may implement a linear function which may provide the input signals (e.g., $x_1(n)$, $x_2(n)$, . . . $x_N(n)$) to another stage of the neural network (e.g., a 'hidden stage' or 'hidden layer'). Accordingly, in the example of FIG. 3, N signals of input data may be provided to an input stage (e.g., an input layer) of a neural network during operation. In some examples, the input data can be data associated with a memory access operation, such as a read and/or write operation. The N signals of input data may be output by the first stage of the neural network 350 to a next stage of the neural network 350. In some examples, the connection between the first stage and the second stage of the neural network 350 may not be weighted—e.g., processing units in the second stage may receive signals unaltered from the first stage in some examples. Each of the input signals may be provided to multiple ones of the processing units in the next stage. While an input layer is shown, in some examples, the input layer may not be present.

The neural network 350 may have a next layer, which may be referred to as a 'hidden layer' in some examples. The next layer may include combiner 352, combiner 354, combiner 356, and combiner 358, although any number of elements may be used. While the processing elements in the second stage of the neural network 350 are referred to as combiners, generally the processing elements in the second stage may perform a nonlinear activation function using the input signals received at the processing element. Any number of nonlinear activation functions may be used. Examples of functions which may be used include Gaussian functions, such as:

$$f(r) = \exp\left(-\frac{r^2}{\sigma^2}\right)$$

Examples of functions which may be used include multi-quadratic functions, such as $f(r)=(r^2+\sigma^2)^{1/2}$. Examples of functions which may be used include inverse multi-quadratic functions, such as $f(r)=(r^2+\sigma^2)^{-1/2}$. Examples of functions which may be used include thin-plate-spline functions, such as $f(r)=r^2 \log(r)$. Examples of functions which may be used include piece-wise linear functions, such as:

$$f(r) = \frac{1}{2}(|r+1| - |r-1|)$$

Examples of functions which may be used include cubic approximation functions, such as:

$$f(r) = \frac{1}{2}(|r^3+1| - |r^3-1|)$$

In these example functions, $\sigma$ represents a real parameter (e.g., a scaling parameter) and r is the distance between the input vector and the current vector. The distance may be measured using any of a variety of metrics, including the Euclidean norm.

Each element in the 'hidden layer' may receive as inputs selected signals (e.g., some or all) of the input data. For example, each element in the 'hidden layer' may receive as inputs from the output of multiple selected units (e.g., some or all units) in the input layer. For example, the combiner 352 may receive as inputs the output of node 368, node 369, node 372, and node 374. While a single 'hidden layer' is shown by way of example in FIG. 3, any number of 'hidden layers' may be present and may be connected in series. While four units are shown in the 'hidden layer', any number may be used, and they may be the same or different in number than the number of nodes in the input layer and/or the number of nodes in any other hidden layer. The nodes in the hidden layer may evaluate at least one non-linear function using combinations of the data received at the hidden layer node (e.g., element). In this manner, the hidden layer may provide intermediate data at an output of one or more hidden layers.

The neural network 350 may have an output layer. The output layer in the example of FIG. 3 may include combiner 360, combiner 362, combiner 364, and combiner 366, although any number of elements may be used. While the processing element in the output stage of the neural network 350 are referred to as combiners, generally the processing elements in the output may perform any combination or other operation using intermediate processing results from a last 'hidden layer' in the neural network. Each element in the output layer may receive as inputs selected intermediate processing results (e.g., some or all) of the data provided by a last 'hidden layer'. For example, the combiner 360 may receive as inputs from the outputs of combiner 352, combiner 354, combiner 356, and combiner 358. The connections between the hidden layer and the output layer may be weighted. For example, a set of weights W may be specified. There may be one weight for each connection between a hidden layer node and an output layer node in some examples. In some examples, there may be one weight for each hidden layer node that may be applied to the data provided by that node to each connected output node. Other distributions of weights may also be used. The weights may be multiplied with the output of the hidden layer before the output is provided to the output layer. In this manner, the output layer may perform a sum of weighted inputs. Accordingly, an output of the neural network 350 (e.g., the outputs of the output layer) may be referred to as a weighted sum. The output layer may accordingly combine intermediate data received from one or more hidden layers using weights to provide output data.

In some examples, the neural network 350 may be used to provide L output signals which represent processed data corresponding to N input signals. For example, in the example of FIG. 3, N input signals are shown ($x_1(n)$, $x_2(n)$, . . . $x_N(n)$) and L output signals are provided ($y_1(n)$, $y_2(n)$, . . . $y_L(n)$). The neural network 350 may be trained such that the weights W used and/or the functions provided by the elements of the hidden layers cause the neural network 350 to provide output signals which represent the processed data corresponding to the N input signals. The input signals may have been data associated with a memory access operation (e.g. a write operation), and the weights and/or functions provided by the elements of the hidden layers may be selected in accordance with the corresponding data characteristic (e.g., data importance) and/or error correction level for the data.

Examples of neural networks may be trained. Training generally refers to the process of determining weights, functions, and/or other attributes to be utilized by a neural network to create a desired transformation of input data to output data. In some examples, neural networks described herein may be trained to determine one or more characteristics of input data. In some examples, neural networks described herein may be trained to select an error correction level for input data.

Training as described herein may be supervised or unsupervised in various examples. In some examples, training may occur using known pairs of anticipated input and desired output data. For example, training may utilize known input data and output data pairs to train a neural network to receive and process subsequent input data (e.g., data for memory access operations) into output data (e.g., data characteristics and/or error correction levels). Examples of training may include determining weights to be used by a neural network, such as neural network 350 of FIG. 3. In some examples, the same neural network hardware is used during training as will be used during operation. In some examples, however, different neural network hardware may be used during training, and the weights, functions, or other attributes determined during training may be stored for use by other neural network hardware during operation.

Examples of training can be described mathematically. For example, consider input data at a time instant (n), given as: $X(n)=[x_1(n), x_2(n), . . . x_N(n)]^T$. The center vector for each element in hidden layer(s) of the neural network 350 (e.g., combiner 352, combiner 354, combiner 356, and combiner 358) may be denoted as $C_i$ (for i=1, 2, . . . , H, where H is the element number in the hidden layer).

The output of each element in a hidden layer may then be given as:

$$h_i(n) = f_i(\|X(n) - C_i\|) \text{ for } (i = 1, 2, \ldots, H) \qquad \text{(Equation 3)}$$

The connections between a last hidden layer and the output layer may be weighted. Each element in the output layer may have a linear input-output relationship such that it may perform a summation (e.g., a weighted summation). Accordingly, an output of the i'th element in the output layer at time n may be written as:

$$y_i(n) = \sum_{j=1}^{H} W_{ij} h_j(n) = \sum_{j=1}^{H} W_{ij} f_j(\|X(n) - C_j\|) \qquad \text{(Equation 4)}$$

for (i=1, 2, . . . , L) and where L is the element number of the output of the output layer and $W_{ij}$ is the connection weight between the j'th element in the hidden layer and the i'th element in the output layer.

Generally, a neural network architecture (e.g., the neural network 350 of FIG. 3) may include a number of elements and may have center vectors which are distributed in the input domain. Generally, the choice of transfer function used by elements in the hidden layer may not affect the mapping performance of the neural network, and accordingly, a function may be used which may be implemented conveniently in hardware in some examples. For example, a thin-plate-spline function and/or a Gaussian function may be used in various examples and may both provide adequate approximation capabilities. Other functions may also be used.

Examples of neural networks may accordingly be specified by attributes (e.g., parameters). In some examples, two sets of parameters may be used to specify a neural network: connection weights and center vectors (e.g., thresholds). The parameters may be determined from selected input data (e.g., encoded input data) by solving an optimization function. An example optimization function may be given as:

$$E = \sum_{n=1}^{M} \|Y(n) - \overline{Y(n)}\|^2 \qquad \text{(Equation 5)}$$

where M is a number of trained input vector (e.g., trained encoded data inputs) and Y(n) is an output vector computed from the sample input vector using Equations 3 and 4 above, and $\overline{Y(n)}$ is the corresponding desired (e.g., known) output vector. The output vector Y(n) may be written as: Y(n)=[y₁(n), y₂(n), . . . y_L(n)]^T Various methods (e.g., gradient descent procedures) may be used to solve the optimization function. However, in some examples, another approach may be used to determine the parameters of a neural network, which may generally include two steps: (1) determining center vectors C_i(i=1, 2, . . . , H) and (2) determining the weights.

In some examples, the center vectors may be chosen from a subset of available sample vectors. In such examples, the number of elements in the hidden layer(s) may be relatively large to cover the entire input domain. Accordingly, in some examples, it may be desirable to apply k-means cluster algorithms. Generally, k-means cluster algorithms distribute the center vectors according to the natural measure of the attractor (e.g., if the density of the data points is high, so is the density of the centers). k-means cluster algorithms may find a set of cluster centers and partition the training samples into subsets. Each cluster center may be associated with one of the H hidden layer elements in this network. The data may be partitioned in such a way that the training points are assigned to the cluster with the nearest center. The cluster center corresponds to one of the minima of an optimization function. An example optimization function for use with a k-means cluster algorithm may be given as:

$$E_{k\_means} = \sum_{j=1}^{H} \sum_{n=1}^{M} B_{jn} \|X(n) - C_j\|^2 \qquad \text{(Equation 6)}$$

where $B_{jn}$ is the cluster partition or membership function forming an H×M matrix. Each column may represent an available sample vector (e.g., known input data) and each row may represent a cluster. Each column may include a single '1' in the row corresponding to the cluster nearest to that training point, and zeros elsewhere.

The center of each cluster may be initialized to a different randomly chosen training point. Then each training example may be assigned to the element nearest to it. When all training points have been assigned, the average position of the training point for each cluster may be found and the cluster center is moved to that point. The clusters may become the desired centers of the hidden layer elements.

In some examples, for some transfer functions (e.g., the Gaussian function), the scaling factor σ may be determined, and may be determined before determining the connection weights. The scaling factor may be selected to cover the training points to allow a smooth fit of the desired network outputs. Generally, this refers to any point within the convex hull of the processing element centers that may significantly activate more than one element. To achieve this goal, each hidden layer element may activate at least one other hidden layer element to a significant degree. An appropriate method to determine the scaling parameter a may be based on the P-nearest neighbor heuristic, which may be given as:

$$\sigma_i = \frac{1}{P} \sum_{j=1}^{P} \|C_j - C_i\|^2 \quad (i = 1, 2, \ldots \ldots, H)$$

where $C_j$ (for i=1, 2, . . . , H) are the P-nearest neighbors of $C_i$.

The connection weights may additionally or instead be determined during training. In an example of a neural network, such as neural network 350 of FIG. 3, having one hidden layer of weighted connections an output elements which are summation units, the optimization function of Equation 5 may become a linear least-squares problem once the center vectors and the scaling parameter have been determined. The linear least-squares problem may be written as $$\min_W \sum_{n=1}^{M} \|Y(n) - \overline{Y(n)}\|^2 = \min_W \sum_{n=1}^{M} \|WF - \hat{Y}\|^2 \qquad \text{(Equation 7)}$$

where W= {$W_{ij}$} is the L×H matrix of the connection weights, F is an H×M matrix of the outputs of the hidden layer processing elements and whose matrix elements are computed using $F_{in} f_i(\|X(n) - C_i\|)$ (i=1, 2, . . . , H; n=1, 2, . . . , M) and $\hat{Y} = [\hat{Y}(1), \hat{Y}(2), \ldots \hat{Y}(M)]$ is the L×M matrix of the desired (e.g., known) outputs. The connection weight matrix W may be found from Equation 7 and may be written as follows:

$$\overline{W} = \overline{Y}F^+ = \overline{Y} \lim_{\alpha \to 0} F^T \left( FF^T + \alpha I \right)^{-1} \qquad \text{(Equation 8)}$$

where $F^+$ is the pseudo-inverse of F. In this manner, the above may provide a batch-processing method for determining the connection weights of a neural network. It may be applied, for example, where all input sample sets are available at one time. In some examples, each new sample set may become available recursively, such as in the recursive-least-squares algorithms (RLS). In such cases, the connection weights may be determined as follows.

First, connection weights may be initialized to any value (e.g., random values may be used). The output vector Y(n) may be computed using Equation 4. The error term $e_i(n)$ of each output element in the output layer may be computed as follows:

$$e_i(n) = y_i(n) - \overline{y}_i(n) \quad (i = 1, 2, \ldots \ldots, L)$$

The connection weights may then be adjusted based on the error term, for example as $$W_{ij}(n+1) = W_{ij}(n) + \gamma e_i(n) f_j(\|X(n) - C_i\|) \qquad \text{(Equation 9)}$$

$$(i = 1, 2, \ldots, L; j = 1, 2, \ldots, M)$$

where $\gamma$ is the learning-rate parameter which may be fixed or time-varying.

The total error may be computed according to the output from the output layer and the desired (known) data:

$$\epsilon = \|Y(n) - \overline{Y(n)}\|^2 \qquad \text{(Equation 10)}$$

The process may be iterated by again calculating a new output vector, error term, and again adjusting the connection weights. The process may continue until weights are identified which reduce the error to equal to or less than a threshold error.

Accordingly, the neural network 350 of FIG. 3 may be trained to determine parameters (e.g., weights) for use by the neural network 350 to perform a particular mapping between input and output data. For example, training the neural network 350 may provide one set of parameters to use when receiving input data to determine a characteristic of a first channel. Additionally or alternatively, training the neural network 350 may provide that set of parameters to use when receiving input data to determine a characteristic of a second channel. The neural network 350 (and/or another neural network) may be trained multiple times, using different known input/output data pairs, for example. Multiple trainings may result in multiple sets of connection weights.

Recall that the structure of neural network 350 of FIG. 3 is provided by way of example only. Other multilayer neural network structures may be used in other examples. Moreover, the training procedures described herein are also provided by way of example. Other training techniques (e.g., learning algorithms) may be used, for example, to solve the local minimum problem and/or vanishing gradient problem. Determined weights and/or vectors for each decoder may be obtained by an off-line learning mode of the neural network, which may advantageously provide more resources and data. Such implementations, having accumulated the intermediate processing results in a respective processing elements (e.g., the respective MAC unit), may also include memory look-up (MLU) units that are configured to retrieve a plurality of coefficients and provide the plurality of coefficients as the connection weights (e.g., determined weights) for that respective layer of MAC units to be mixed with the input data.

Figure 4:
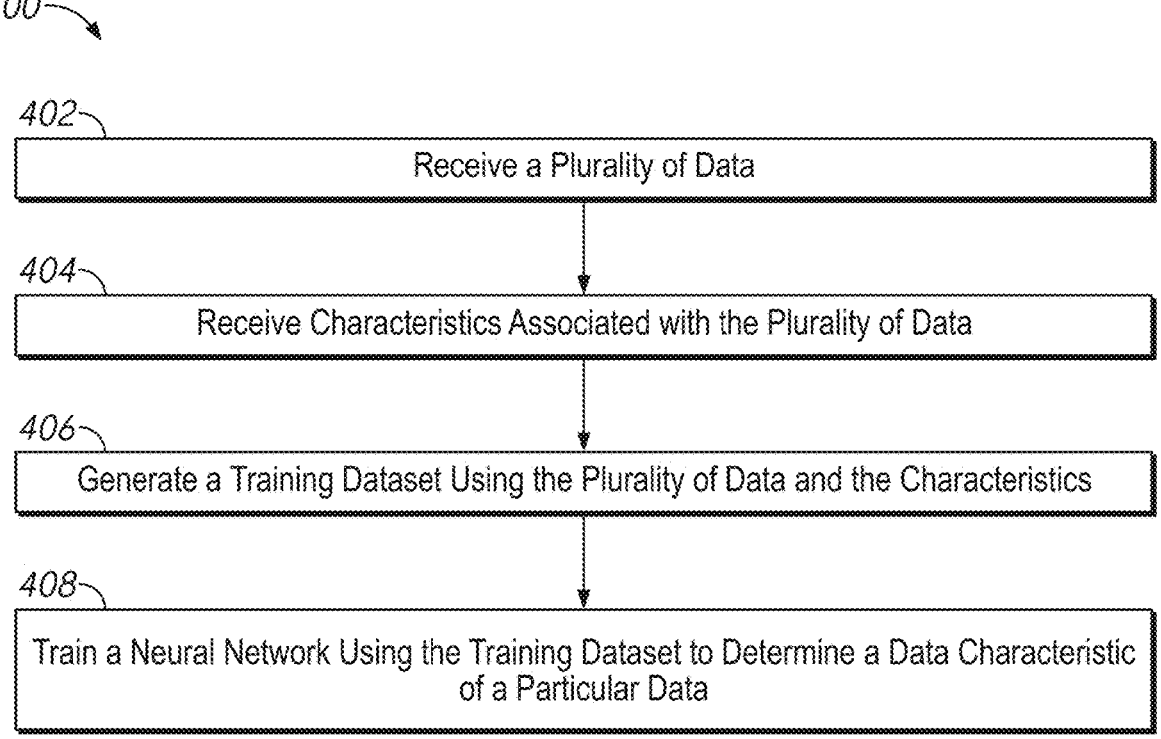
FIG. 4 is a flow diagram that illustrates a process for training a neural network to determine a data characteristic, in accordance with various embodiments.

FIG. 4 is a flow diagram that illustrates a process 400 for training a neural network to determine a data characteristic, in accordance with various embodiments. The process 400 can be performed, for example, using at least a portion of the system 100 of FIG. 1, such as the host computing device 104 and/or the memory controller 102 and/or the system 200 of FIG. 2. The neural network trained using the process 400 can be the neural network 350 of FIG. 3.

The process 400 includes receiving a plurality of data, at 402. For example, each of the plurality of the data can be data associated with a memory access operation (e.g., a write operation or a read operation). The data can be written to and/or read from a memory, such as one or more of memory devices 112 of FIG. 1, in some examples.

The process 400 further includes receiving characteristics associated with the plurality of data, at 404. For example, the characteristics can include at least a relative importance associated with each of the plurality of data. In some implementations, the characteristics can include one of a first relative importance associated with relatively unimportant data, a second relative importance associated with data of ordinary importance, and a third relative importance associated with highly important data. The characteristics associated with the plurality of data can also include a level of error correction applied to or associated with the data. As described herein, the error correction levels can indicate an amount of error correction performed for the data (e.g., a number of ECC bits stored with the data), and the error correction levels can correspond to the relative importance of the data (e.g., with little or no error correction performed for unimportant data and greater error correction performed for highly important data).

The process 400 further includes generating a training dataset using the plurality of data and the characteristics associated with the plurality of data, at 406. For example, the training dataset can include a correlation between the error correction levels and one or more other characteristics associated with the respective data, such as relative importance of the data. In some implementations, the characteristics received at 404 include only error correction levels for the data. In these and other implementations, generating the training dataset can include calculating one or more variable values associated with the data, such as values for variables associated with amounts or types of data or other data attributes. For example, a variable value can be calculated to indicate an amount of redundancy in the data. Additionally or alternatively, a variable value can be calculated based on contents of the data.

The process 400 further includes training a neural network using the training dataset to determine a data characteristic for received data, at 408. Training the neural network can be as described with reference to FIGS. 2 and 3. For example, when trained, the neural network can receive data associated with memory access operations and determine one or more characteristics of the data, such as relative importance of the data and/or an error correction level that should be applied to the data. Training the neural network can comprise configuring the neural network (e.g., through iterative training operations) to generate outputs (e.g., data characteristics and/or levels of error correction) based on received inputs (e.g., input data associated with memory access operations).

In some implementations, the process 400 further includes applying the trained neural network to determine one or more data characteristics of particular data and/or selecting a level of error correction based on determining one or more data characteristics of the particular data. For example, the process 400 can include one or more operations of the process 500 of FIG. 5.

Once trained, the neural network can be stored for use, for example, in the data characteristic logic 108 of FIG. 1.

In some implementations, the process 400 includes testing the trained neural network. For example, a portion of the received data and the received characteristics can be excluded from the training dataset and used as test data to assess the accuracy of the trained neural network. The trained neural network may be applied to the test data to determine whether the trained neural network correctly determines characteristics of data (e.g., data associated with memory access operations) and/or error correction levels for data with an accuracy beyond a threshold level (e.g., 70%, 80%, 90%, etc.). If the trained neural network does not exceed the threshold accuracy, then the neural network can be retrained or discarded in favor of a more accurate model.

Retraining the neural network can include training the neural network at least a second time using the training dataset, training the neural network with a different (e.g., expanded) training dataset, applying different weights to a training dataset, rebalancing a training dataset, and so forth.

Figure 5:
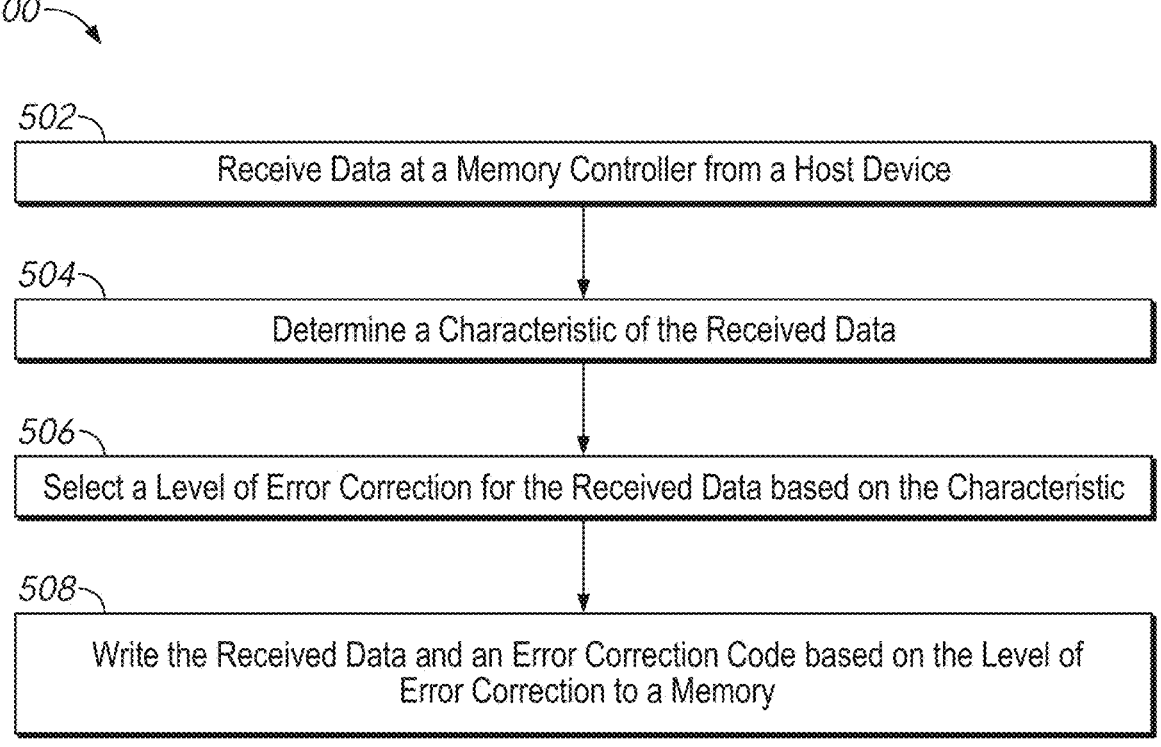
FIG. 5 is a flow diagram that illustrates a process for selecting a level of error correction based on a data characteristic, in accordance with various embodiments.

FIG. 5 is a flow diagram that illustrates a process 500 for selecting a level of error correction based on a data characteristic, in accordance with various embodiments. The process 500 can be performed, for example, using at least a portion of the system 100 of FIG. 1, such as the memory controller 102, and/or the system 200 of FIG. 2. In some implementations, at least a portion of the process 500 can be performed, at least in part, using a neural network, such as the neural network 350 of FIG. 3 and/or a neural network trained using the process 400 of FIG. 4.

The process 500 includes receiving data at a memory controller from a host device, at 502. For example, the data can include data for performing a memory access operation, such as data to be written to a memory pursuant to a write operation.

The process 500 further includes determining a characteristic of the received data, at 504. For example, a data characteristic logic (e.g., 108 of FIG. 1) can determine a data characteristic of the received data, which can be an importance level of the received data (e.g., unimportant, ordinary importance, highly important). In some implementations, the data characteristic can be determined using a neural network. In some implementations, the characteristic can be received from the host device. For example, the received data can include metadata that indicates the characteristic, such as the importance level of the data.

The process 500 further includes selecting a level of error correction for the received data based on the characteristic, at 506. The level of error correction can be selected from a plurality of error correction levels, such as respective error correction levels for certain importance levels of data. For example, no error correction may be performed for unimportant data, ordinary error correction may be performed for data of ordinary importance, and extra data correction may be performed for data that is highly important. The level of error correction can be selected by a data characteristic logic (e.g., 108 of FIG. 1) and/or a memory control logic (e.g., 110 of FIG. 1) of a memory controller (e.g., 102 of FIG. 1).

The process 500 further includes writing the data to memory with an error correction code, at 508. The error correction code is generated based on the selected level of error correction. In some implementations, the process 500 includes generating the error correction code. In some implementations, no error correction code is generated, such as when the level of error correction indicates that no error correction should be performed.

In some implementations, the process 500 includes writing different data to different memories, such as based on data characteristics and/or levels of importance. For example, second received data and a second error correction code corresponding to a second selected level of error correction of the plurality of error correction levels different from the selected level of error correction can be written to a second memory.

Although the processes 400 and 500 include certain operations depicted as being performed in a certain order, it will be appreciated that more or fewer operations may be included in the processes 400 and 500 without deviating from the teachings of the present disclosure. Additionally, operations of the processes 400 and/or 500 can be performed in a different order, including performing one or more operations in parallel.

It is to be appreciated that any one of the examples, embodiments or processes described herein may be combined with one or more other examples, embodiments and/or processes or be separated and/or performed amongst separate devices or device portions in accordance with the present systems, devices and methods.

Although the present technology has been disclosed in the context of certain preferred embodiments and examples, it will be understood by those skilled in the art that the disclosed technology extends beyond the specifically disclosed embodiments to other alternative embodiments and/or uses of the technology and obvious modifications and equivalents thereof. In addition, other modifications which are within the scope of the disclosed technology will be readily apparent to those of skill in the art based on this disclosure. It is also contemplated that various combinations or sub-combinations of the specific features and aspects of the embodiments may be made and still fall within the scope of the disclosed technology. It should be understood that various features and aspects of the disclosed embodiments can be combined with or substituted for one another in order to form varying modes of the disclosed technology. Thus, it is intended that the scope of at least some of the present technology herein disclosed should not be limited by the particular disclosed embodiments described above.

What is claimed is:

1. A method, comprising:
   receiving data at a memory controller from a host device;
   determining a characteristic of the received data;
   selecting a level of error correction from a plurality of error correction levels for the received data based on the determined characteristic;
   writing the received data and an error correction code generated based on the selected level of error correction to a memory of a plurality of memories; and
   selecting the memory based on the error correction code.

2. The method of claim 1, further comprising generating the error correction code based on the selected level of error correction.

3. The method of claim 1, further comprising selecting no error correction level as the selected level of error correction for the received data.

4. The method of claim 1, further comprising determining an importance level associated with the received data as the characteristic.

5. The method of claim 1, further comprising receiving the characteristic of the received data from the host device.

6. The method of claim 1, further comprising:

writing, to a second memory, second received data and a second error correction code corresponding to a second selected level of error correction of the plurality of error correction levels different than the selected level of error correction.

7. The method of claim 1, wherein the characteristic of the received data is determined using a neural network.

8. An apparatus, comprising:

a memory controller configured to:

receive data from a host device;

determine a characteristic of the received data;

select a level of error correction from a plurality of error correction levels for the received data based on the determined characteristic;

write the received data and an error correction code generated based on the selected level of error correction to a memory of a plurality of memories; and selecting the memory based on the error correction code.

9. The apparatus of claim 8, further comprising the memory.

10. The apparatus of claim 8, wherein the memory controller is further configured to generate the error correction code based on the selected level of error correction.

11. The apparatus of claim 8, wherein the memory controller is further configured to select no error correction level as the selected level of error correction for the received data.

12. The apparatus of claim 8, wherein the memory controller is further configured to determine an importance level associated with the received data as the characteristic.

13. The apparatus of claim 8, wherein the memory controller is further configured to receive the characteristic of the received data from the host device.

14. The apparatus of claim 8, wherein the memory controller is further configured to:

write, to a second memory, second received data and a second error correction code corresponding a second selected level of error correction of the plurality of error correction levels different than the selected level of error correction.

15. The apparatus of claim 8, wherein the memory controller is configured to determine the characteristic of the received data using a neural network.

\* \* \* \* \*